No. 897,068. PATENTED AUG. 25, 1908.
E. J. DIENER.
DOUGH DIVIDING AND MOLDING MACHINE FOR BREAD.
APPLICATION FILED NOV. 30, 1907.
2 SHEETS—SHEET 1.
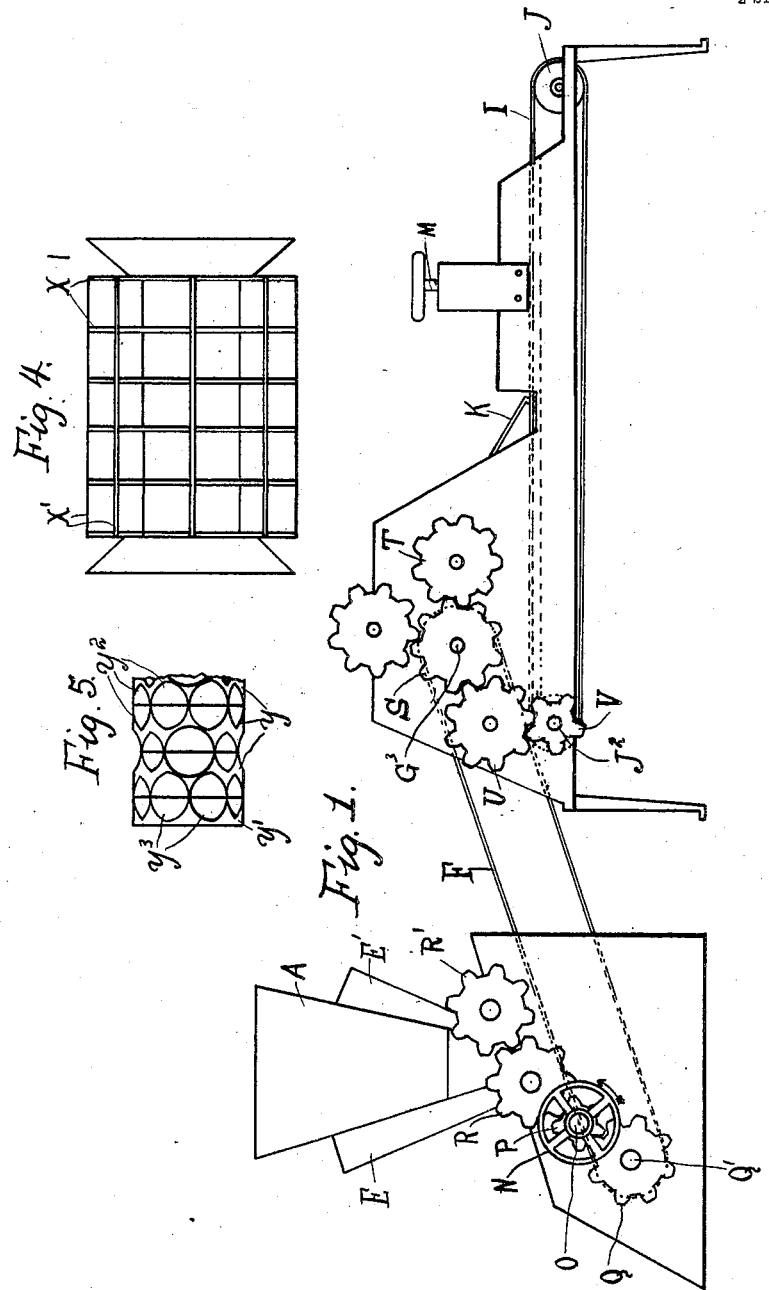
WITNESSES
INVENTOR
ATTORNEY No. 897,068. PATENTED AUG. 25, 1908.
E. J. DIENER.
DOUGH DIVIDING AND MOLDING MACHINE FOR BREAD.
APPLICATION FILED NOV. 30, 1907.
2 SHEETS—SHEET 2.
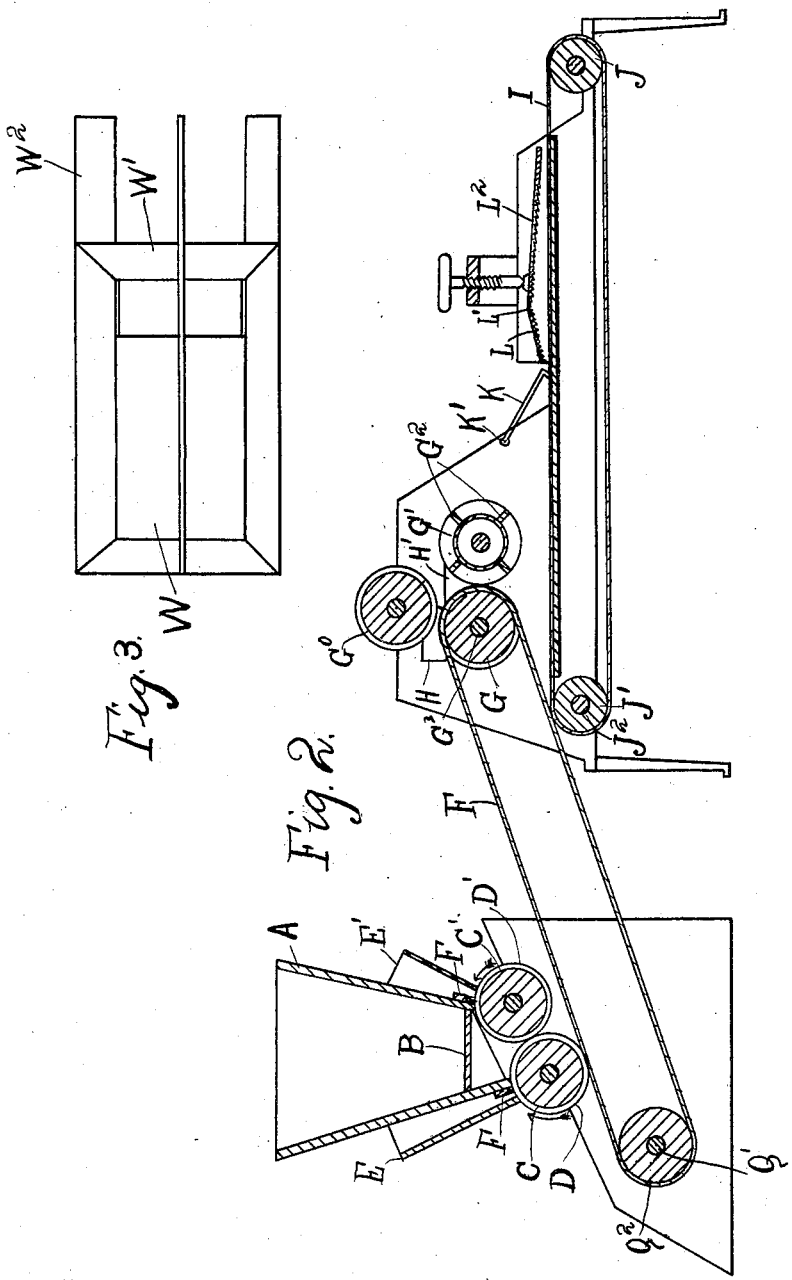

UNITED STATES PATENT OFFICE.

EMIL J. DIENER, OF PHILADELPHIA, PENNSYLVANIA.

DOUGH DIVIDING AND MOLDING MACHINE FOR BREAD.

No. 897,068.  Specification of Letters Patent.  Patented Aug. 25, 1908.

Application filed November 30, 1907. Serial No. 404,610.

*To all whom it may concern:*

Be it known that I, EMIL J. DIENER, a citizen of the United States, residing at Philadelphia, in the county of Philadelphia and State of Pennsylvania, have invented a certain new and useful Improvement in Dough Dividing and Molding Machines for Bread, of which the following is a specification.

My invention relates to a new and useful improvement in dough dividing and molding machines for bread, and has for its object to provide an exceedingly simple and effective device of this character by means of which the hopper of the machine may be filled with dough and it will be unnecessary to again touch the dough until it has come from the machine formed for baking.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of my improved machine. Fig. 2, a longitudinal section thereof. Fig. 3, a view of my two piece cylinder showing it partly extended and the dividing knives in position. Fig. 4, a view of the roll cutting cylinder. Fig. 5, a view of my doughnut cutting cylinder, being slightly reduced and partly broken away.

In carrying out my invention as here embodied, A represents the hopper, having the bottom B, which is made to pull in and out or to drop down as may be desired, so that the dough may be kept within the hopper until it is to be used.

When it is desired that the dough pass through the machine, the bottom is opened and the dough will then pass between the cylinders C and C', which have the flanges D and D' extending outside of the cylinders themselves, thus it will be readily understood that it will be impossible for the dough to squeeze outside of the said flanges but will form into a strip the thickness of the distance between the two cylinders.

To prevent the dough from sticking to the cylinders, I provide the small hoppers E and E', fastened to the sides of the larger hopper, in which is placed some flour, so that it may run upon the cylinders C and C' and as very little flour is needed, I place the stiff brushes F within these small hoppers and resting upon the cylinders C and C', so that they will be constantly brushing the flour from the cylinders back into the hoppers E and E'.

When the strip of dough passes between the cylinders C and C' it goes to the traveling belt F, which carries it upward and between the cylinders G and G', where it is rolled into the width equal to the distance between the guides H, which may be regulated by proper means, and then between G and G' where it is cut into strips of the desired length by the knives $G^2$, placed upon the cylinder G'. To prevent the dough from squeezing out from between these two cylinders and compel it to pass between the same, I provide the guide H'. When the dough has passed between the two last named cylinders it goes to the traveling belt I, which passes over the pulleys J and J', these pulleys being so timed that the belt I travels considerably faster than the belt F, so that when the dough has passed to the belt I, there will be a number of inches distance between each strip. As each of these strips pass along the belt I the front end of the dough will be turned slightly upward by the L-shaped trigger K, which is pivoted to the frame work of the machine at K', and this trigger will be raised, when the dough will be released and pass beneath the toothed member L, which is pivoted at L', so that the dough will be rolled into a thick roll, then it passes beneath the toothed member $L^2$ and is again rolled until it gradually becomes thinner, longer and tighter, then passes out from underneath the member $L^2$, where it may be taken from the belt I and placed in pans to be baked. Should it be desired that the dough be still longer and thinner when it comes from the machine, I provide a clamp screw M, which may be tightened upon the member $L^2$, thus bringing it closer to the belt I, so that the dough will be rolled thinner and will naturally get longer.

For transmitting power to the machine, I provide the pulley N, which travels in the direction of the arrow, being secured to the shaft O, on which is also secured the cog wheel P, the teeth of which mesh with the teeth of the larger cog wheels Q and R, and the teeth on the cog wheels R and R' which mesh together are of extra deep cut so that the cylinders C and C' may be moved to and from each other when so desired, thus making the strip of dough thin or thick. The cog wheel Q is fastened upon the shaft Q', to which is also secured the pulley $Q^2$, over which passes the belt F, said belt passing over the roller G, which is used both as a pulley and a cylinder, through which passes the shaft $G^3$, and to this is secured the cog wheel S, its teeth meshing with the teeth of the cog wheels T and U. Thus these are made to rotate, and the belt I is made to move through the medium of the pulley J', being fastened to the shaft $J^2$, on which is secured the cog wheel V, its teeth meshing with those of the cog wheel U.

In Fig. 3 I have shown one of my cylinders, consisting of two parts W and W', having the knives $W^2$ fastened to the ledge of one of the parts and allowed to slide through slots cut in the rim of the other part W'. This cylinder may be set to cut four pieces of dough of a pound in weight, or more or less as may be desired.

In Fig. 4 I have shown a slightly modified form of cylinder, to which is attached the circular knives X, having slots cut therein for the reception of the knives X'. This cylinder cuts dough in the sizes used for making rolls.

In Fig. 5 I have shown still another form of cylinder, which is made of the members Y and Y'. The openings $Y^2$, are cut first one on one side and then one on the other from each of the said members Y, but the openings $Y^3$ are cut only from one side of the members Y'. These openings form semicircles. When these members are placed together and keyed upon a shaft they form a series of circles around the circumference of the cylinder, so that disks will be cut from the dough for forming doughnuts or round rolls.

Having thus fully described my invention, what I claim as new and useful, is—

1. In a dough dividing and molding machine, a hopper, a sliding bottom, a smaller hopper, a brush fastened therein, two cylinders having flanges, two other cylinders, knives fastened to one of said cylinders for cutting the dough into short strips, a belt for conveying the dough from the first two named cylinders to the second two named cylinders, a guide for keeping the dough in place, an L-shaped trigger for turning up the forward end of the dough, a movable toothed member, a stationary toothed member, said members being used to roll the dough, a belt for conveying the dough from the last two named cylinders under the trigger, the toothed members and out of the machine, a clamp screw for tightening the stationary member and means for transmitting power to the machine.

2. The herein described combination of two cylinders having flanges, a hopper for holding the dough until it is to pass between the two said cylinders, a second smaller hopper for holding flour, a brush held in position upon the cylinder, a second set of cylinders, on one of which is placed a number of knives for cutting the dough into small strips, means for conveying the dough to said cylinders, a trigger for turning up the forward end of the dough, toothed members for rolling said dough and means for conveying it from the last named cylinders under the toothed members and away from the machine, as specified.

In testimony whereof, I have hereunto affixed my signature in the presence of two subscribing witnesses.

EMIL J. DIENER

Witnesses:
S. M. GALLAGHER,
E. N. SCHOFIELD.